United States Patent [19]
Zigon

[11] Patent Number: 5,269,690
[45] Date of Patent: Dec. 14, 1993

[54] ORIENTATION SYSTEM FOR FOOTWEAR

[76] Inventor: Robert J. Zigon, 4645 Orlando Ct., Indianapolis, Ind. 46208

[21] Appl. No.: 996,025

[22] Filed: Dec. 23, 1992

[51] Int. Cl.⁵ .............. G09B 25/00; G09B 19/00; G09B 19/24
[52] U.S. Cl. .................... 434/397; 434/258; 434/260; 36/112
[58] Field of Search .......... 434/258, 260, 397; 2/DIG. 6; 36/112, 136

[56] References Cited

U.S. PATENT DOCUMENTS

| | | | |
|---|---|---|---|
| 3,258,858 | 7/1966 | Cariffe, Jr. | 434/397 X |
| 3,906,642 | 9/1975 | Cohen | 434/260 |
| 4,458,432 | 7/1984 | Stempski | 36/136 X |
| 4,628,622 | 12/1986 | McBarron | 36/112 X |
| 4,832,606 | 5/1989 | Clark et al. | 434/258 |
| 5,136,726 | 8/1992 | Kellin et al. | 36/136 X |
| 5,240,418 | 8/1993 | Silverman et al. | 434/260 |

FOREIGN PATENT DOCUMENTS

| | | | |
|---|---|---|---|
| 8101948 | 7/1981 | Norway | 36/112 |
| 2617592 | 5/1986 | United Kingdom | 36/112 |

*Primary Examiner*—Gene Mancene
*Assistant Examiner*—Cindy A. Cherichetti
*Attorney, Agent, or Firm*—Baker & Daniels

[57] ABSTRACT

An orientation system for use with footwear. The orientation system comprises a first attachment member located on and substantially flush with the left side of the right shoe and a second attachment member located on and substantially flush with the right side of the left shoe. The first and second attachment members can be adhesively connected with the shoes or constructed integral with the shoes. When pressed together, the first attachment member engages the second attachment member and connect the left shoe and right shoe together in a proper orientation. The system allows a child to properly orient her shoes to allow her to put each shoe on its proper foot without adult supervision.

22 Claims, 2 Drawing Sheets

ORIENTATION SYSTEM FOR FOOTWEAR

FIELD OF THE INVENTION

This invention relates to improvements in juvenile footwear and, in particular, to an orientation system for juvenile footwear which allows a juvenile to independently orient her footwear or shoes, in preparation for wearing, to facilitate her placing each shoe on the proper foot without adult assistance.

BACKGROUND OF THE INVENTION

The development of a child is a gradual process which is marked in great part by the child's independent mastering of a given task formerly performed for her by an adult. This task mastering often evolves through a child's exhaustive trial and error while receiving assistance from adults. The rewards of such an accomplishment are two-fold, benefitting both the child and adults. The child develops a sense of pride, growing confident in her abilities. Moreover, an adult is freed from a task, which, though cute the first few times performed, may become probably exasperating due to its frequent repetition.

A common task which most every child eventually masters, and one which due to its redundancy proves tiresome for assisting adults, pertains to footwear or shoes. It is well accepted that young children are incapable of consistently putting their shoes on correctly without adult assistance. Typical problems for children include both lacing up their shoes and tieing the shoelaces as well as the seemingly simple task of placing the left and right shoes on their respective feet. The evolution of footwear wherein laces have been replaced with VELCRO straps, as well as the existence of slip-on footwear, has addressed the former problem which prevented children from independently putting on their shoes. Nonetheless, the latter problem remains unaddressed and unresolved.

Small children typically have difficulty properly orienting their shoes for wear as they are unable to distinguish between their left and right shoes. As a result, when dressing without adult supervision, a child often places her shoes on the opposite feet for which they are designed; a child simply revels in the fact that her shoes are on. However, the resulting adult intervention to correct the problem, and thereby prevent harm to the child's feet, not only is time consuming for an adult, but also undermines the child's self-esteem. At other times, children track down and interrupt adults to ask which foot goes in which shoe. Thus, even if a child possesses slip-on shoes or those footwear equipped with VELCRO straps, the assistance of an adult is still required to guarantee the shoes are properly worn.

Previous solutions to this shoe orientation problem, while not wholly inadequate, suffer from serious shortcomings. An adult can mark the shoes as left and right or "L" and "R". However, teaching a child to distinguish and interpret the meanings of these two letters is a task unto itself, and a distinction which a child will frequently forget as soon as the lesson has terminated. Alternatively, as a means of insuring proper wearing of footwear an adult can align a child's shoes in the proper left-right orientation and place then in her closet or any other location where shoes are normally situated. Nonetheless, these shoes will almost assuredly not remain in their proper orientation until and during their placement by a child on her feet.

OBJECTS OF THE INVENTION

One object of the invention is to provide a footwear orientation system which enables children to independently determine which shoe goes on which foot, thereby increasing the pride and self-esteem of the child who puts her shoes on by herself.

Another object of the invention is to decrease the likelihood of an adult needing to assist a child in putting on the child's shoes by providing a juvenile footwear orientation system which enables children to independently orient their shoes.

Another object of the invention is to provide an inexpensive way to encourage children to keep pairs of footwear together, thereby ending the difficulty for adults of locating a matching pair of children's shoes.

Another object is to provide a juvenile footwear orientation system which is fun and easy to use such that a child will take an interest and play an active role in properly orienting her footwear for use.

SUMMARY OF THE INVENTION

The orientation system of the present invention is designed for use with footwear which comprises a right shoe with a right side and left side and a left shoe with a right side and left side. The orientation system, in one form thereof, comprises a first attachment member located on and substantially flush with the left side of the right shoe and a second attachment member located on and substantially flush with the right side of the left shoe. The first and second attachment members can be adhesively connected with the shoes or constructed integral with the shoes. When pressed together, the first attachment member engages the second attachment member and serve to connect the left shoe and right shoe together in a proper orientation.

By providing an orientation system for orienting and connecting footwear, the invention offers several benefits. A child can now independently properly orient her shoes to allow her to put each shoe on its proper foot without adult supervision. Also, as the system maintains a pair of footwear together, the likelihood of a child misplacing a single piece of footwear is reduced, which makes an adult's task of finding a matched pair of a child's shoes less difficult.

DETAILED DESCRIPTION

Figure 1:
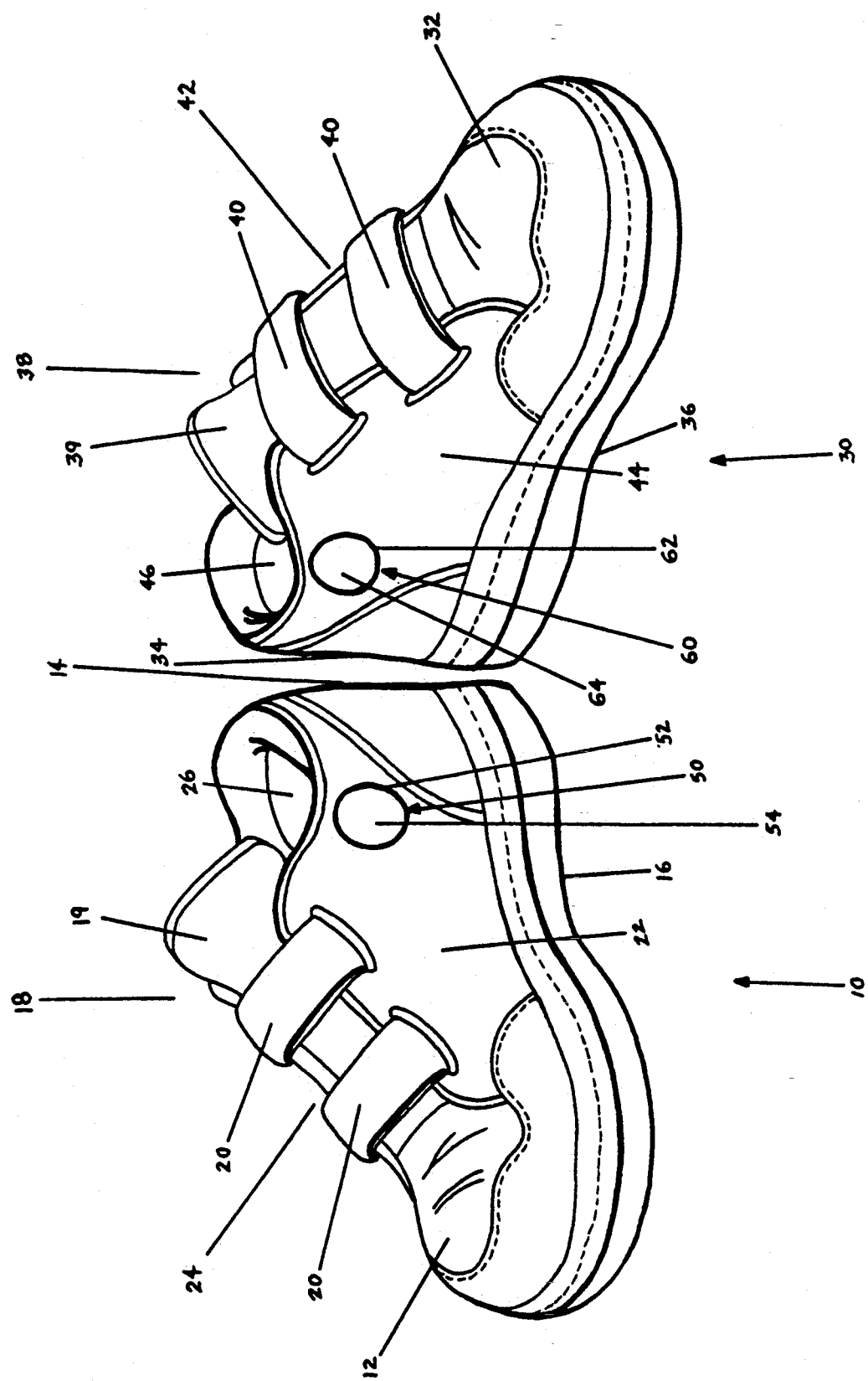
FIG. 1 shows a perspective view of one embodiment of the invention.

Referring now to the Figures, there are shown two embodiments of the improved orientation system of the present invention. Each embodiment is shown employed on a pair of juvenile footwear wherein a right shoe, generally designated 10, and a left shoe, generally designated 30, are illustrated in a spaced apart or unconnected relationship. For explanatory purposes, the right-left labeling convention utilized in describing shoes 10,30 will be adhered to throughout the following description. Moreover, corresponding patts in the various figures have corresponding numbers.

Right shoe 10 includes a forward toe portion 12, a rearward heel portion 14, a bottom surface 16, a left side 22, a right side 24, and a top portion 18 comprising a foot insertion opening 26 and the upward facing portion of the shoe forward of foot insertion opening 26, such as, for example, shoe tongue 19 and VELCRO fasteners 20. Left shoe 30 similarly includes a forward toe portion 32, a rearward heel portion 34, a bottom surface 36, a left side 42, a right side 44, and a top portion 38 comprising a foot insertion opening 46 and the upward facing portion of the shoe forward of foot insertion opening 46, such as, for example, shoe tongue 39 and VELCRO fasteners 40. Although the embodiments shown are being utilized with footwear commonly classified as juvenile shoes, those of skill in the art will appreciate in view of the following disclosure that the instant invention can readily be adapted for use with nearly any type or style of footwear.

Referring now to FIG. 1, first attachment member 50 is located on the left side 22, or inner side, of right shoe 10 and second attachment member 60 is located on the right side 44, or inner side, of left shoe 30. Preferably positioned more proximate to rearward heel portion 14 than forward toe portion 12, first attachment member 50 is located at a position intermediate top portion 18 and bottom surface 16. Second attachment member 60 is positioned at a location similar to first attachment member 50, but with respect to corresponding shoe elements of rearward heel portion 34, forward toe portion 32, top portion 38, and bottom surface 36. It is within the scope of the present invention to locate attachment members 50,60 on the sides of a shoe heel or sole. As a result, right shoe 10 and left shoe 30 are substantial mirror images.

In this embodiment, first attachment member 50 is of a circular shape and includes an inner side, or right side 52, which directly contacts left side 22 of right shoe 10. Inner side, or left side 62, of second attachment member 60 similarly directly contacts right side 44 of left shoe 30. Right side 52 of first attachment member 50 and left side 62 of second attachment member 60 further comprise an adhesive which securely fastens the attachment members 50,60 to their respective shoes 10,30.

The left side 54, or outer side, of first attachment member 50 and the right side 64, or outer side, of second attachment member 60 respectively preferably comprise a VELCRO hooks component and a complementary VELCRO loops component. Alternatively, a magnetic component with a given polarity and a complementary magnetic component with an opposite polarity may be utilized. Adhesive backed VELCRO of the type described above can be purchased in many hardware stores. Attachment members 50,60 are substantially flush with shoe sides 22,44, thereby not interfering with the normal use and wear of the shoes. When right shoe 10 and left shoe 30 are properly aligned in a left-right orientation and subsequently pressed together, the first and second attachment members 50,60 are thereby pressed together and engage each other. As a result, attachment members 50,60 connect to form a VELCRO attachment, whereby right shoe 10 and left shoe 30 are effectively connected together. Similarly, numerous other means of attachment, such as a magnetic attachment, may be substituted for the VELCRO attachment. Such alternate attachment means are considered within the scope of the present invention.

Those of skill in the art will understand that attachment members 50,60 need not be of any particular shape or color to function effectively, leaving the decision as to both to the user putting the teachings of this invention into practice. The user must merely ensure attachment members 50,60 are of sufficient size to maintain together under normal conditions connected right shoe 10 and left shoe 30.

Figure 2:
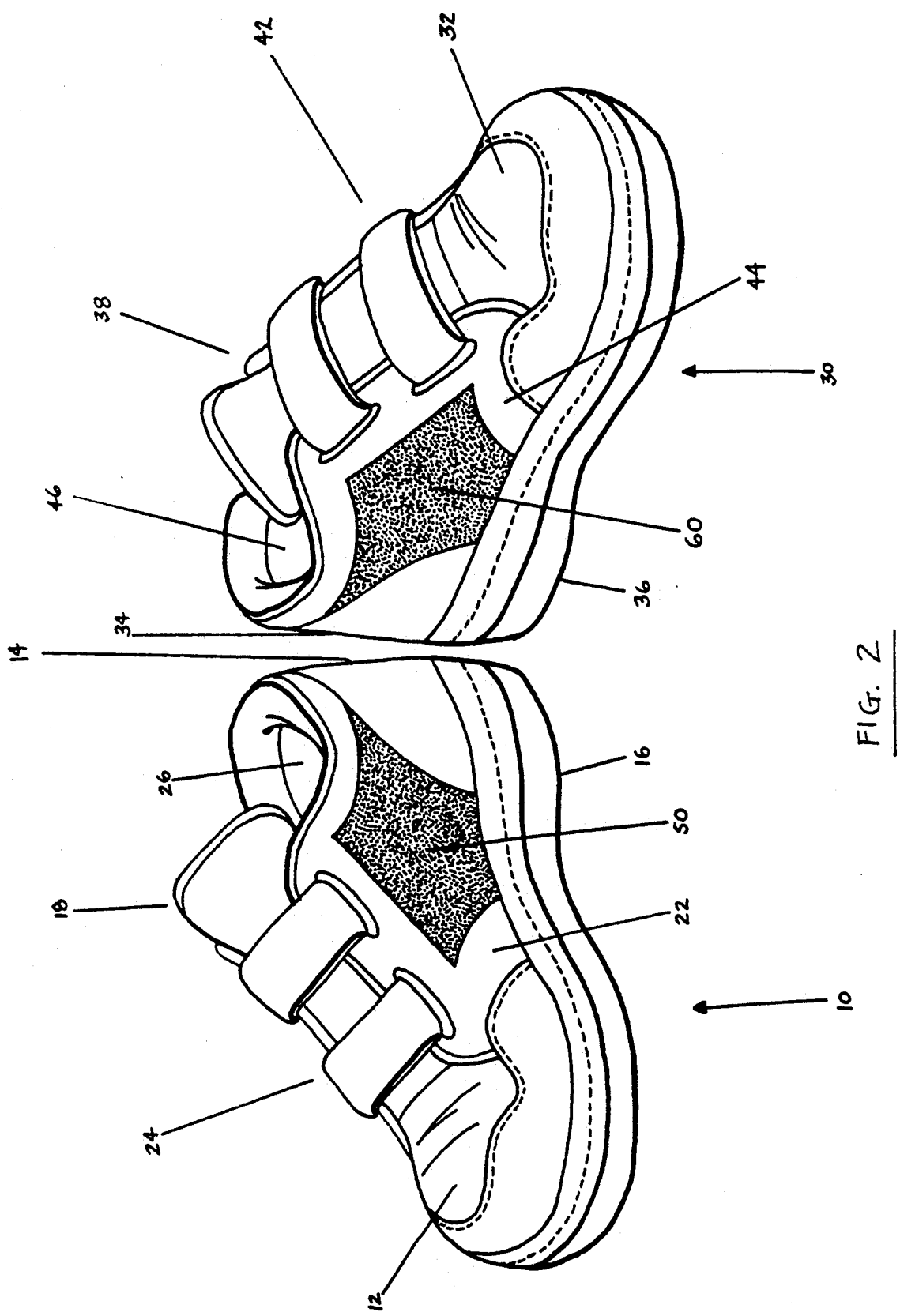
FIG. 2 shows a perspective view of another embodiment of the invention.

In another embodiment of the invention shown in FIG. 2, first attachment member 50 and second attachment member 60 are incorporated into the shoe design and constructed integral with right shoe 10 and left shoe 30 respectively. Attachment members 50,60 function identical to the corresponding members in FIG. 1 described herein. In addition to the design illustrated wherein a significant portion of shoe sides 22,44 are utilized as attachment members 50,60, alternative designs which are more aesthetically pleasing, especially in the eyes of a child, are envisioned. For instance, integral attachment members configured in fanciful designs such as Mickey Mouse or other familiar cartoon characters or shoe manufacturer's logos would provide the shoe connection and orientation function of the invention while enhancing the footwear appearance. The shoe design shown in FIG. 1 could also be constructed according to the teachings of FIG. 2, resulting in circular attachment members 50,60 integral with shoes 10,30.

As is evident from the foregoing disclosure, the invention provides an orientation system for footwear which provides many useful and heretofore unprovided functions. Most importantly, the orientation system operates to connect shoes together in the proper left-right orientation so many children can dispense with adult assistance when putting on their shoes. Rather than asking an adult which shoe goes on which foot, a child can first independently properly orient and connect her shoes by pressing the shoes and thereby the aligned attachment members together, or alternatively remove from her closet a pair of shoes previously connected. Then, after placing her connected shoes on the ground in front of her in the natural position wherein the shoe toes point forward, she may step each foot into its proper shoe. A child's newfound ability to put on her own shoes boosts her self-esteem, as well as removes one small task, which is significant in the aggregate, from the long list of things for which a supervising adult is responsible. Moreover, the orientation system of the invention is fun and easy to use, thereby increasing the likelihood that children will use the invention. Children will undoubtedly find great delight in repeatedly connecting together and later separating the shoes, especially when VELCRO attachment members are utilized which create the distinctive VELCRO ripping sound during separation. The invention further serves to keep pairs of children's shoes together such that whenever a matched pair is needed, a pair can readily be located.

What is claimed is:

1. A footwear orientation system comprising:
    a right shoe with a right side and left side;
    a left shoe with a right side and left side;
    a first attachment member located on and substantially flush with the left side of the right shoe, the first attachment member continuously facing away from the left side of the right shoe; and
    a second attachment member located on and substantially flush with the right side of the left shoe, the second attachment member continuously facing away from the right side of the left shoe,
    the first attachment member being engageable with the second attachment member, thereby connecting the left shoe and the right shoe.

2. The orientation system of claim 1 wherein the first attachment member and the second attachment member each comprise a left side and right side;
- the right side of the first attachment member comprises an adhesive for fastening the first attachment member to the right shoe;
- the left side of the second attachment member comprises an adhesive for fastening the second attachment member to the left shoe.

3. The orientation system of claim 1 wherein the first attachment member and the second attachment member are integral with the right shoe and left shoe respectively.

4. The orientation system of claim 1 wherein the first attachment member and the second attachment member respectively comprise hooks component and a complementary loops component which when pressed together form a hooks and loops attachment.

5. The orientation system of claim 4 wherein the first attachment member and the second attachment member each comprise a left side and right side;
- the right side of the first attachment member comprises an adhesive for fastening the first attachment member to the right shoe;
- the left side of the second attachment member comprises an adhesive for fastening the second attachment member to the left shoe; and
- the left side of the first attachment member and the right side of the second attachment member respectively comprise the hooks component and the complementary loops component.

6. The orientation system of claim 4 wherein the first attachment member and the second attachment member are integral with the right shoe and left shoe respectively.

7. The orientation system of claim 1 wherein the first attachment member and the second attachment member respectively comprise a magnetic component with a given polarity and a complementary magnetic component with an opposite polarity which are connectable to form a magnetic attachment.

8. The orientation system of claim 7 wherein the first attachment member and the second attachment member each comprise a left side and right side;
- the right side of the first attachment member comprises an adhesive for fastening the first attachment member to the right shoe;
- the left side of the second attachment member comprises an adhesive for fastening the second attachment member to the left shoe; and
- the left side of the first attachment member and the right side of the second attachment member respectively comprise the magnetic component with a given polarity and the complementary magnetic component with an opposite polarity.

9. The orientation system of claim 7 wherein the first attachment member and the second attachment member are integral with the right shoe and left shoe respectively.

10. An orientation system, for use with footwear comprising a right shoe and a left shoe each having a bottom surface, a top portion, a right side and a left side, the system comprising:
- a first attachment member connected to the left side of the right shoe at a position intermediate the top portion and the bottom surface;
- a second attachment member connected to the right side of the left shoe at a position intermediate the top portion and the bottom surface;
- the first attachment member being engageable with the second attachment member, and
- wherein the first attachment member and the second attachment member are located at a position on the right shoe and left shoe respectively such that when the first attachment member and second attachment members are engaged, the left shoe and the right shoe are connected together in a proper left-right orientation with the bottom surface of the right shoe and the bottom surface of the left shoe being substantially coplanar.

11. The orientation system of claim 10 wherein the connections between the first attachment member and the right shoe and the second attachment member and the left shoe are adhesive.

12. The orientation system of claim 10 wherein the first attachment member and the second attachment member respectively comprise a hooks component and a complementary loops component which when pressed together form a hooks and loops attachment.

13. The orientation system of claim 10 wherein the first attachment member and the second attachment member respectively comprise a magnetic component with a given polarity and a complementary magnetic component with an opposite polarity which are connectable to form a magnetic attachment.

14. The orientation system of claim 10 wherein the first attachment member may engage the second attachment member by pressing said members against each other.

15. An orientation system, for use with footwear comprising a right shoe and a left shoe each having a bottom surface, a top portion, a right side and a left side, the system comprising:
- a first attachment member integral with the left side of the right shoe at a position intermediate the top portion and the bottom surface;
- a second attachment member integral with the right side of the left shoe at a position intermediate the top portion and the bottom surface;
- the first attachment member being engageable with the second attachment member, and
- wherein the first attachment member and the second attachment member are located at a position on the right shoe and left shoe respectively such that when the first attachment member and second attachment members are engaged, the left shoe and the right shoe are connected together in a proper left-right orientation with the bottom surface of the right shoe and the bottom surface of the left shoe being substantially coplanar.

16. The orientation system of claim 15 wherein the first attachment member and the second attachment member respectively comprise a hooks component and a complementary loops component which when pressed together form a hooks and loops attachment.

17. The orientation system of claim 15 wherein the first attachment member and the second attachment member respectively comprise a magnetic component with a given polarity and a complementary magnetic component with an opposite polarity which are connectable to form a magnetic attachment.

18. The orientation system of claim 15 wherein the first attachment member may engage the second attachment member by pressing said members against each other.

19. The orientation system of claim 15 wherein the position of the first attachment member on the right shoe and the position of the second attachment member on the left shoe are substantial mirror images.

20. A footwear orientation system comprising:
a right shoe with a right side and left side;
a left shoe with a right side and left side;
a first attachment member located on the left side of the right shoe;
a second attachment member located on the right side of the left shoe;
the first attachment member being engageable with the second attachment member, thereby connecting the left shoe and the right shoe;
wherein the first attachment member and the second attachment member each comprise a left side and right side;
the right side of the first attachment member comprises an adhesive for fastening the first attachment member to the right shoe; and
the left side of the second attachment member comprises an adhesive for fastening the second attachment member to the left shoe.

21. The orientation system of claim 20 wherein the first attachment member and the second attachment member respectively comprise a hooks component and a complementary loops component which when pressed together form a hooks and loops attachment, and wherein the left side of the first attachment member and the right side of the second attachment member respectively comprise the hooks component and the complementary loops component.

22. The orientation system of claim 20 wherein the first attachment member and the second attachment member respectively comprise a magnetic component with a given polarity and a complementary magnetic component with an opposite polarity which are connectable to form a magnetic attachment, and wherein the left side of the first attachment member and the right side of the second attachment member respectively comprise the magnetic component with a given polarity and the complementary magnetic component with an opposite polarity.

* * * * *